United States Patent [19]

Pawlosky

[11] Patent Number: 4,955,273

[45] Date of Patent: Sep. 11, 1990

[54] ONE PIECE INSERTED SAW TOOTH

[76] Inventor: Anthony J. Pawlosky, R.D. 1, Hickory, Pa. 15340

[21] Appl. No.: 360,600

[22] Filed: Jun. 2, 1989

[51] Int. Cl.$^5$ ............................................... B23D 59/00
[52] U.S. Cl. .......................................... 83/845; 83/839
[58] Field of Search ................. 83/839, 838, 842, 845; 164/112, 35

[56] References Cited

U.S. PATENT DOCUMENTS

| 67,682 | 8/1867 | Strange | 83/839 |
|---|---|---|---|
| 81,811 | 9/1868 | Miller | 83/839 |
| 108,059 | 10/1870 | Smith | 83/839 |
| 151,043 | 5/1874 | Miller | 83/839 |
| 303,787 | 8/1884 | Arnold | 83/839 |
| 4,417,381 | 11/1983 | Higginbotham | 164/35 |
| 4,744,278 | 5/1988 | Wright | 83/845 |

Primary Examiner—Frank T. Yost
Assistant Examiner—Hwei-Siu Payer
Attorney, Agent, or Firm—Waldron & Associates

[57] ABSTRACT

A one piece saw tooth insert for use in combination with a circular saw of the inserted bit type wherein said insert has a bit portion and a shank portion combined as a single piece, wherein the shank portion has a generally circular outer edge surface adapted to be received by a generally circular edge surface of said socket without any substantial deformation of said shank portion, and the bit portion has a generally circular outer edge surface adapted to be received by another circular edge surface on the socket, such that the bit portion is elastically deformed by being pivoted in the direction of the cutting edge of the insert to thereby lock the one piece insert into the socket.

12 Claims, 4 Drawing Sheets

ONE PIECE INSERTED SAW TOOTH

BACKGROUND OF THE INVENTION

This invention relates generally to insertable saw teeth for circular saw blades as utilized in commercial sawmills, and more particularly to a new and improved, one piece, insertable saw tooth which provides numerous advantages over the prior art two-piece inserts, such as, it is self-centering when inserted onto a saw blade, eliminates of any movement and working between the bit and the shank, provides greater strength and tension to the rim section of the saw blade, is less prone to causing damage to the saw blade holding the insert, is safer than the prior art two-piece saw tooth, can be inexpensively tipped and retipped to provide an exceptionally long life span as well as other advantages discussed below.

Practically all circular saws utilized in commercial sawmills utilize saw blades which have replaceable saw teeth. Because such commercial circular saw blades are relatively large, having diameters up to 60 inches, they are relatively expensive. Therefore, when the saw teeth become damaged to the point where they cannot be reshaped, it is far less costly to merely replace the damaged teeth rather than replacing the entire saw blade.

Cut-off saw blades, i.e. those used for cutting logs to length and therefore cut across the grains of the lumber, usually utilize insertable saw teeth which comprise elongated one-piece inserts which merely slide into a mating elongated socket on the saw blade. While the inserts are dimensionally proportioned to fit rather snugly within the sockets, it is further essential that the inserts be riveted to thereby lock the inserts into the saw blade sockets.

Headrig saws, i.e. those used for the breakdown of logs which normally cut the log parallel to the grains, as this invention pertains to, all utilize a two piece saw tooth insert, which comprise a bit, which in part forms the cutting edge of the saw tooth, and a shank, which serves to lock the bit in place within a circular socket on the periphery of the saw blade, thereby eliminate the need of a rivet. There are primarily only two basic types of headrig saws and inserted teeth therefor in commercial use, namely the single circle and double circle types, with differing sizes of the two basic types. The circular nature of the socket permit the bit and shank to be rotated thereinto with an end portion of the shank biased against the bit to hold it in place.

The above noted two piece saw tooth inserts have been successfully used for well over half a century, providing the benefit for which they were designed. While there have been a number of minor design changes, normally for use in unusual applications, such as the cutting of frozen lumber and the like, the basic design has remained virtually unchanged since the 1920's. Despite the fact that the design has proven itself to be rather successful, there are problems that are encountered when using such two piece inserts. Most notable of these problems result primarily from the two piece nature of the insert, in that use of the saw blade will naturally cause some relative movement between the bit and shank. This movement may cause the bit to creep radially outward to adversely effect the cutting force of the saw. On the other hand, such movement may cause the edge of the saw blade to bend at the shoulder, with the result that the saw blade is pulled one way or the other, seriously effecting the straightness of the cut. It is also know that the weakest line in the saw blade shoulder is at the joint between the bit and the shank, so that relative movement between the bit and shank, which causes bending of the shoulder, may in fact even cause the shoulder to fracture, which not only causes serious damage to the saw blade, but can be a very hazardous situation as the high speed motion of the fractured shoulder and both saw tooth inserts will cause them to be propelled in practically any direction. In view of this movement between the bit and shank, which naturally results, it is necessary that the bit and shank inserts be periodically reset, which, of course, means additional downtime.

Another difficulty caused by the two piece inserts, is that they do not always align themselves properly when inserted into the saw blade. Despite the fact the edges of the two pieces and the edges of the saw blade sockets are provided with mating "V"s and "V" grooves, the two piece inserts can and do "hinge" to some degree within the saw blade socket, or may otherwise be improperly aligned when inserted. Indeed, when such inserts are first inserted into a saw blade, it is required practice that the broad-side surfaces of the inserts be tapped with a hammer to properly seat the "V"s into the "V" groves and otherwise assure that the two pieces are properly centered with reference to the saw blade and to each other. Even when such inserts are properly aligned, they can become misaligned during service, as noted above, due to movement between the two pieces.

Still another disadvantage of the two piece saw tooth inserts, is the fact that they do become dulled rather rapidly, and as a result have to be resharpened quite frequently. While some bits have been provided with hard cutting inserts, such as carbide tips soldered thereto to form the cutting edge, the design of the bits are such that they are not readily amenable to carbide tipping as there is little steel surface to back up and support such a tip, and the bits are such small pieces to work with that the cost of tipping or retipping is rather high. In fact the cost of retipping carbide tipped bit is so high, that most commercial mills do not find them to be cost justified. Accordingly, most mills do not utilize hard tipped bits.

A further disadvantage of the prior art saw tooth inserts is that because insertion and removal of the insert assembly causes wear on the saw blade sockets, that the saw blade sockets do wear down, somewhat enlarging the radius of the circular socket. This then necessitates that the saw tooth supplier provide shank portions in a variety of slight oversizes for use with those saws in which the sockets have worn larger as a result of repeated insertion and removal of the inserts over a period of years.

An ever further disadvantage of the prior art saw tooth insert assemblies is that they do not provide uniform and consistent tensile forces on the rim of the saw blade to the extent desired. That is to say, rotational forces and frictional heat, causes the peripheral portion of the saw blade to expand to a greater extent that the portions radially inward therefrom. In the absence of any corrective effort, this action would tend to put the rim of the saw blade in compression, with the result that the two areas of the saw blade are not in a state of stress equilibrium during operation. When such a deviation from equilibrium does happen and becomes excessive, the saw blade will tend to warp or buckle, so that it will not cut in a straight line. Because of this phenomenon, it is common practice to physically work, i.e. compress, the inner portions of the saw blade so that it is in a static state of compression, and therefore, the rim portion is put in a static state of tension, when the saw blade is not in use. Subsequent use of the saw blade in service, however, will heat the rim portion, as noted above, so that the static forces within the saw blade will approach equilibrium. When the two piece saw tooth inserts are utilized, the expansive action of the inserts compressed into the sockets often causes a variable compressive force in the rim of the saw blade so that the desired tensile forces in the rim are not usually as uniform as desired. Moreover, because of the nature of the inserts, and the relative movement that occurs therebetween, as discussed above, the tensile forces in the rim of the saw blade will vary during use from one insert to the next, over even a short period of time.

SUMMARY OF THE INVENTION

This invention is predicated on the conception and development of a one piece saw tooth insert for existing headrig saws as a replacement for the conventional two piece inserts, and overcomes the above noted disadvantages encountered with the two piece inserts. While it had not heretofore been believed that one piece saw tooth inserts could be properly locked into a saw blade without the use of a rivet, the one piece saw tooth inserts of this invention can indeed be locked into the saw blade more effectively than can the two piece inserts, and without the use of a rivet. The one piece saw tooth inserts of this invention are, in fact, more firmly retained within the conventional saw blade sockets than are the prior art two piece inserts, to thereby eliminate any creep, and eliminate any possible relative movement between the bit and shank or between the bit and shank insert and saw blade. Because the one piece insert is considerably more firmly inserted without the possibility of movement, the insert of this invention further overcome the above noted disadvantages of the prior art two piece saw tooth inserts as well as providing numerous other unexpected advantages, as will be explained hereinafter.

DETAILED DESCRIPTION OF THE INVENTION

Figure 1:
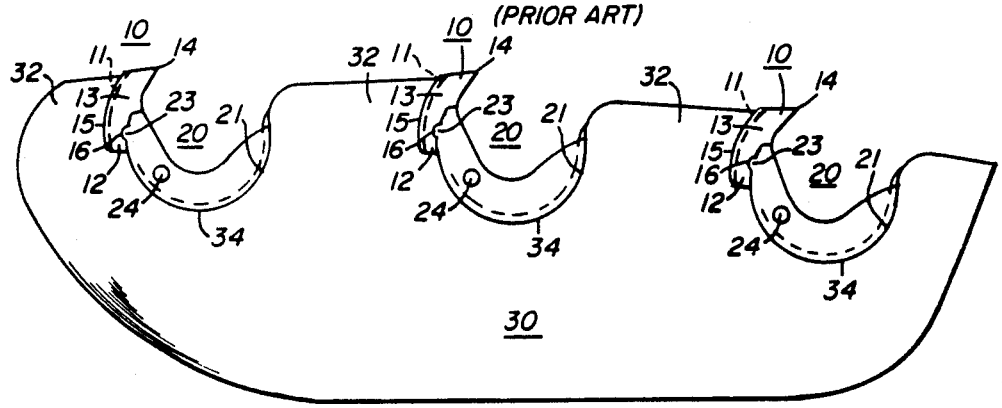
FIG. 1 illustrates a plan view of a portion of the prior art saw blade showing a two piece saw tooth inserted thereon.
Figure 2:
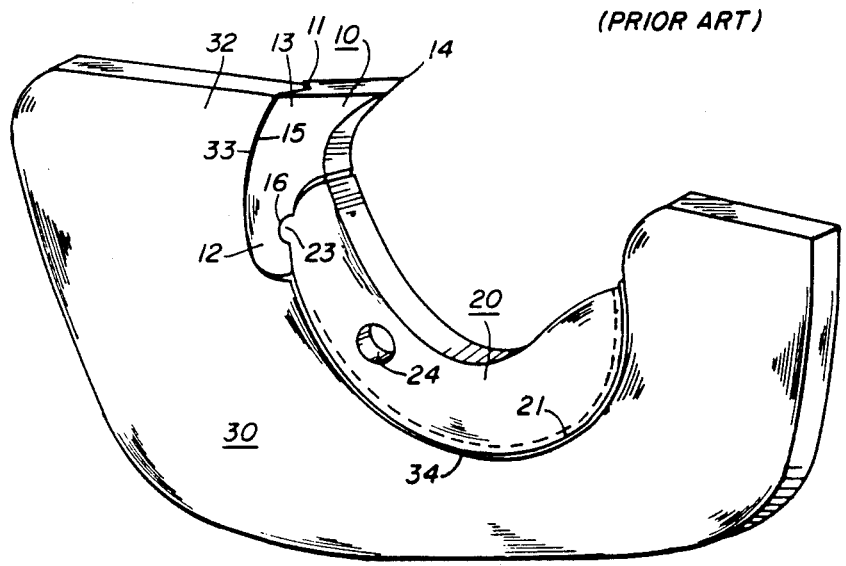
FIG. 2 is an isometric view of the prior art bit and shank insert portions of the saw tooth insert illustrated in FIG. 1.
Figure 3:
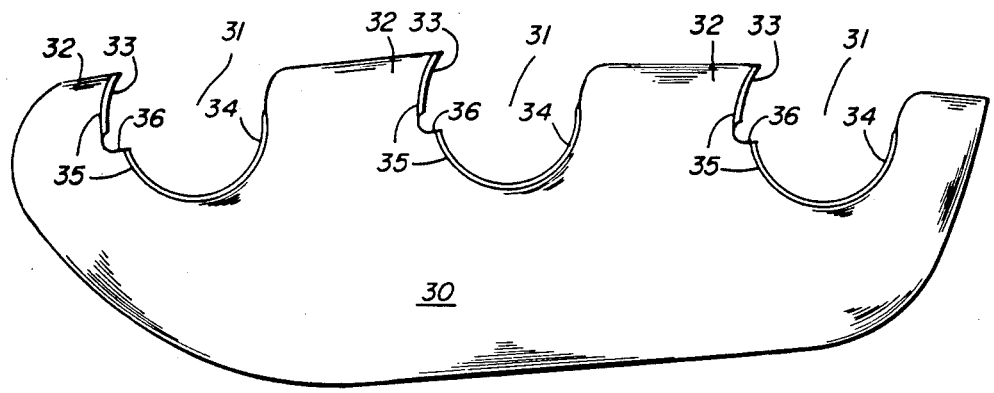
FIG. 3 is also illustrative of a portion of a prior art saw blade of the two circle type as shown in FIG. 1 without any insert to illustrate an empty socket and the radial relationship of the two curved edge surfaces.

Reference to FIGS. 1, 2 and 3, illustrating the prior art, may serve to provide a better understanding of this invention. The prior art saw tooth insert shown in FIGS. 1 and 2 comprises a bit 10 and shank 20 as inserted into a saw blade 30. As can better be seen in FIG. 3 the saw blade 30 is a steel disk provided with a plurality of generally circular sockets 31 uniformly spaced around the periphery thereof. The solid portion of the saw blade between adjacent sockets 31, i.e. shoulders 32, each provide abutments or back supports for the inserted bit 10 in it cutting action. The sockets 31 in FIGS. 1 and 3, are of the two-circle type wherein two separate circular edge surfaces 33 and 34 are provided, having different radial lengths with slightly off-set centers of radii, as shown if FIG. 3. Each circular edge surface 33 and 34 is provided with a beveled or "V" edge 35, adapted to mate with a corresponding "V" grooves 11 and 22 in the bit 10 and in shank 20 respectively. The two circular edge surfaces 33 and 34 are joined by a transverse shoulder edge surface 36.

The tooth bits 10 are slightly elongated and generally arcuate metal pieces comprising a leg 12 and a head 13 extending generally circumferentially of the saw with the forward portion terminating in a cutter tip 14. The cutter tip 14 may be formed in any preferred way, by filing, swaging, grinding tipping or otherwise providing a transverse chisel-like cutting edge at the uppermost leading edge. The back edge 15 of bit 10 is circular in form having the same radius as that of circular edge surface 33 of socket 31, and as noted above, circular edge surface 15 is provided with a "V" groove 11 so that bit 10 will fit snugly against circular edge surface 33 of socket 31. A ball seat 16, which in essence is a small, somewhat rounded indented portion, is provided on the inside edge of bit 10 across from the circular back edge 15.

The shank 20 has a generally crescent configuration adopted to be fit within socket 31, against circular edge surface 34. Accordingly, the lower outer edge 21 thereof is circular and provided with a "V" groove 22, so it will properly seat against the "V"ed edge of circular edge surface 34. A small protrusion or "ball" 23 is provided at one end of shank 20, which is adopted to engage ball seat 16 on bit 10. While the lower edge 21 is circular for the purpose of mating with circular edge surface 34 of socket 31, the radius of edge 21 of shank 20 is somewhat larger than the radius of edge surface 34 of socket 30. The purpose of this is so that shank 20 will have to be elastically deformed as it is rotated into socket 31, thereby being "spring loaded" when properly inserted. The spring loading effect will cause shank 20 to be tightly biased against the surface 34 of socket 31 and in particular, tightly biased against bit 10, so that the force of ball 23 within ball seat 16 will forcibly hold bit 10 in place, with the circular back edge 15 of bit 10 firmly held against circular edge surface 33 of socket 31. A hole 24 is provided through the mid portion of shank 20 for the purpose of engaging a tool so that the inserts can be inserted and removed form the saw blade socket 31.

To insert the two inserts 10 and 20 a special tool (not shown) is required which is designed to engage shank 20, which in part has a retractable pin insertable into hole 24. The shank 20 is then rotated into socket 31 working in a counter-clockwise direction with reference to the drawings. When the shank is partially inserted, bit 10 is positioned such that ball seat 16 is engaged over ball 16. Further rotation of shank 20 into socket 31 will cause bit 10 to be pulled into place as shown in FIG. 1. The open space within socket 31 not consumed by the inserts is of course the essential gullet which serves to temporarily collect the saw dust cut from lumber before the tooth clears the lumber.

With the two piece saw tooth properly inserted as described above, it is seen that bit 10 is held in place by shank 20, and is provided with back support by shoulder 32 of saw blade 31, and is prevented from being rotated further into socket 31 by the fact that leg 12 thereof is firmly abutted against transverse shoulder edge surface 36.

Figure 4:
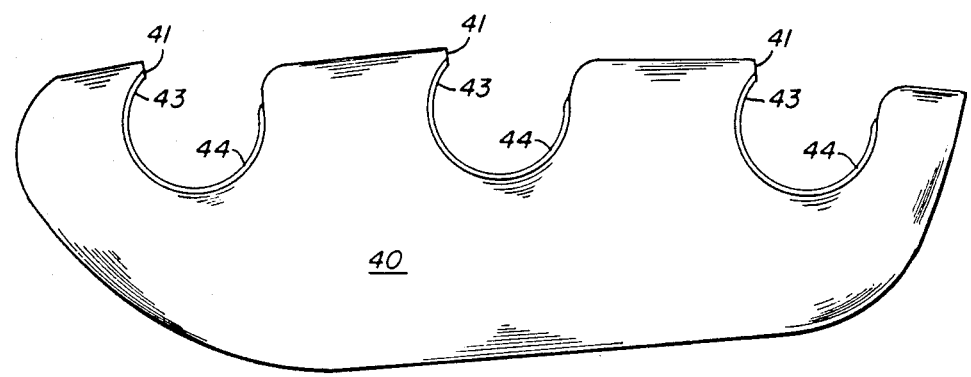
FIG. 4, is identical to FIG. 3 except that it illustrates a prior art saw blade of the one circle type.

Reference to FIG. 4 will illustrate the socket arrangement as utilized on saw blades of the one circle type. As should be apparent, the arrangement is quite similar to that described above for saw blades of the two circle type. Accordingly, the features and functions as described above for the two circle type saw blade are essentially the same in a one circle saw blade, except for the face that circular edge surfaces 43 and 44 are on the same common radius. Because of this, a transverse shoulder edge surface, such as surface 36 of socket 31 cannot be provided. Accordingly, the support function provided by surface 36 of socket 31, is provided in socket 40 by a protruding surface 41.

Figure 5:
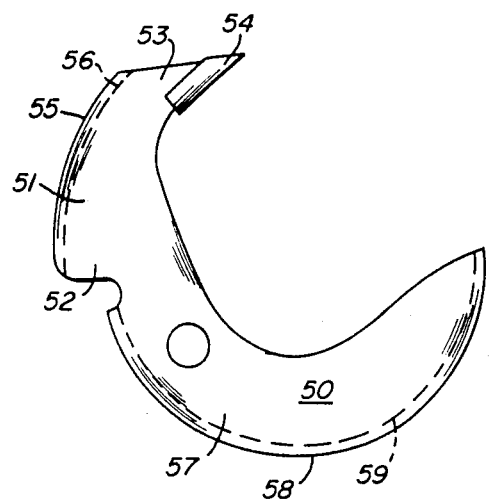
FIG. 5 is a plan view of a one piece saw tooth according to this invention for use in a saw blade of the two circle type shown in FIG. 3.
Figure 6:
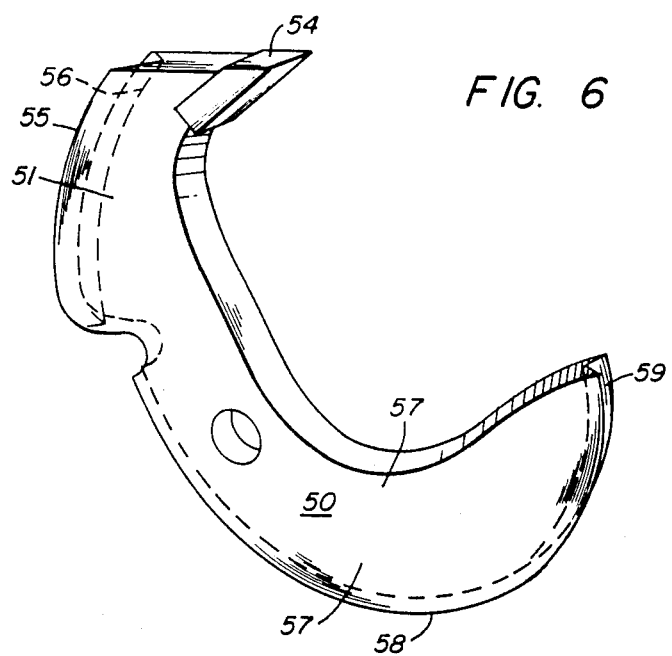
FIG. 6 is an isometric view of the saw tooth insert shown in FIG. 5.

The saw tooth according to this invention consists of a one piece insert, which in general appearance, looks much like the prior art bit and shank formed as a single piece without an interface therebetween. That is, bit portion 51 and shank portion 57 are but different portions of the one piece insert. There are other differences, however, in that the insert of this invention is necessarily dimensioned and proportioned somewhat differently. The one piece saw tooth insert 50 shown in FIG. 5 is designed for use in a saw blade of the two circle type, as illustrated in FIG. 3. As shown, the saw tooth insert comprises an bit portion 51 and a shank portion 52, which in essence fit into a saw blade socket 31 of the two circle type, as do the prior art bit 10 and shank 20. Like the prior art bit 10, the bit portion 51 of the inventive insert is slightly elongated and generally arcuate in form having a leg 52 and a head 53 extending generally circumferentially of the saw with the forward portion terminating in a cutter tip 54. While the cutter tip 54 may be formed in any preferred way, by filing, swaging, grinding tipping or otherwise providing a transverse chisel-like cutting edge at the uppermost leading edge, it has been found that a hardened insert such as a carbide tip is ideally suited to this insert as will be discussed subsequently. The back edge 55 of bit portion 51 is circular in form, in essence having the same radius as that of circular surface 33 of socket 31 to which it will be abutted. Consistent with the prior art technique, circular edge surface 55 is provided with a "V" groove 56 so that the bit portion 51 of the insert 50 will retained and centered against circular edge surface 33 of socket 31.

The shank portion 57 of insert 50 has a generally crescent configuration adopted to be fit within socket 31 adjacent to circular edge surface 34, as is the case with the prior art shank 20. Accordingly, the lower edge 58 thereof is circular and provided with a "V" groove 59. When the one piece insert 50 of this invention is inserted into a socket 31 it will appear to be substantially the same a the prior art bit and shank, 10 and 20 respectively, except that there is no interface between the bit and shank as the insert is all in one piece.

Unlike the prior art bit 10 and shank 20, however, there are unique differences which permit the one piece insert 50 to be firmly held within the socket 31. Specifically, the radius of circular edge surface 58 of the shank portion 57 of the insert is not oversized, as is the case with the prior art shank, but rather has a radius which in essence is the same as the radius of circular edge surface 34 of socket 31 to which it is mated. Unlike the prior art, therefore, the shank portion 57 is not surface 58, being generally the same as that of edge surface 34 is such that the shank portion of the insert will freely revolve within the socket without any deformation or force applied thereto. In a like manner, the back edge 55 of bit portion 51 has a radius which in essence is the same as the radius of circular edge surface 33 of socket 31. One important feature of the one piece insert of this invention, is the fact that while the two radii on the insert are generally the same as the two radii on the socket, the arrangement of the two radii on the insert are different from those defining the socket. That is to say, they are different before the insert is inserted into the socket. Specifically, the circular back edge 55 of the bit portion 51 is slightly tipped in a more open configuration than is circular edge surface 33 of socket 31, so that when the insert is inserted into socket 31, the bit portion 51 is caused to be elastically deflected, i.e. pivoted, with cutting tip 14 pivoted in the direction of the cutting direction. This elastic deformation of bit portion 51 within socket 31 caused circular back edge 55 to be tightly biased against circular edge surface 33 to virtually lock the insert in place.

Figure 7:
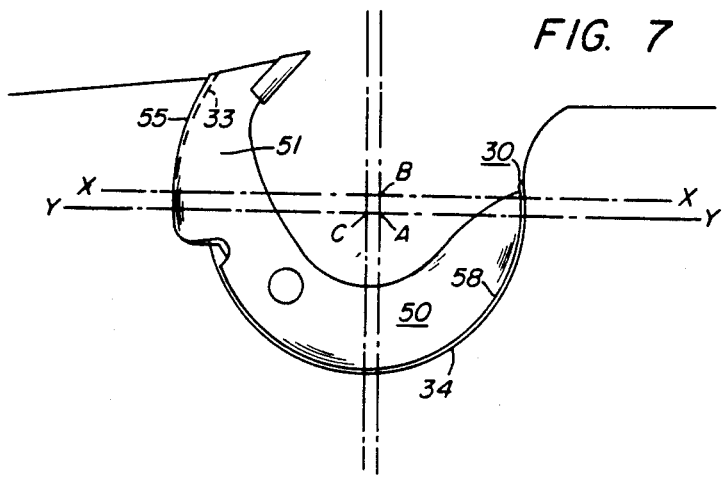
FIG. 7 is a profile plan view of the inventive saw tooth insert shown in FIG. 5 showing the dimensional proportions thereof in contrast to an overlaying profile of a socket into which it is to be inserted shown with a dashed line.
Figure 8:
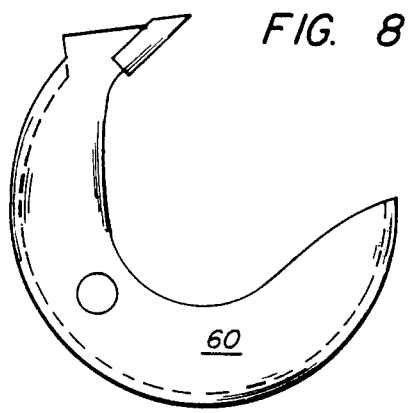
FIG. 8 is a plan view of a one piece saw tooth according to this invention for use in a saw blade of the one circle type shown in FIG. 4.

Reference to FIG. 7 will serve to illustrate and quantify to above noted misalignment where the profile of insert 50 is shown in a solid line and is overlaying the profile of socket 31 shown with a dashed line. Where insert 50 and socket 31 have the exact same profile, the dashed line of the socket cannot be seen. Only where the insert and socket profiles are different, can the profile of the socket be seen in FIG. 7. As can be seen from FIG. 7, circular back edge 55 of the bit portion 51 is slightly tipped in a more open configuration than is circular edge surface 33 of socket 31. As shown in FIG. 7, point A is the center of radius of circular edge surface 33, and point B is the center of radius of circular surface 55 of insert 50. As can be seen, the centers of radius of the surfaces 33 and 34, points A and C respectively, defining the socket 31, both lie in the same plane, y—y. This plane y—y is an imaginary plane taken through the radius of the circle defining circular edge surface 34 which is perpendicular to the radius of the saw blade at that point of radius. However, the center of radius B, of circular back surface 55 of insert 50, is on plane x—x, which is parallel to and raised from plane y—y by an amount of about 2 to 9 percent of the radial length, and ideally 4 to 5 percent, i.e. the length of the radii defining circular edge surface 34 or circular back surface 55. In view of these differences, it should be apparent that the saw tooth insert 50 is not designed to fit within socket 31 without some degree of plastic deformation of the insert, in that the insert 50 cannot be inserted without deforming the insert such that the bit portion 51 is pivotally and elastically deformed towards the cutting direction. When the insert is properly inserted, the primary compressive forces caused by the socket, is applied primarily at the outer edge of shoulder 32 at one point, with the opposed force primarily against the full circular surface of circular edge surface 34. It should be apparent from the above description that in essence, the bit portion 51 and shank portion 57 are not in and of themselves significantly deformed to any significant degree, but rather the entire insert 50 is modestly deformed, such that the bulk of the deformation is characterized by compressive forces concentrated primarily at the mid-portion between the bit and shank portions 51 and 57 respectively.

Figure 9:
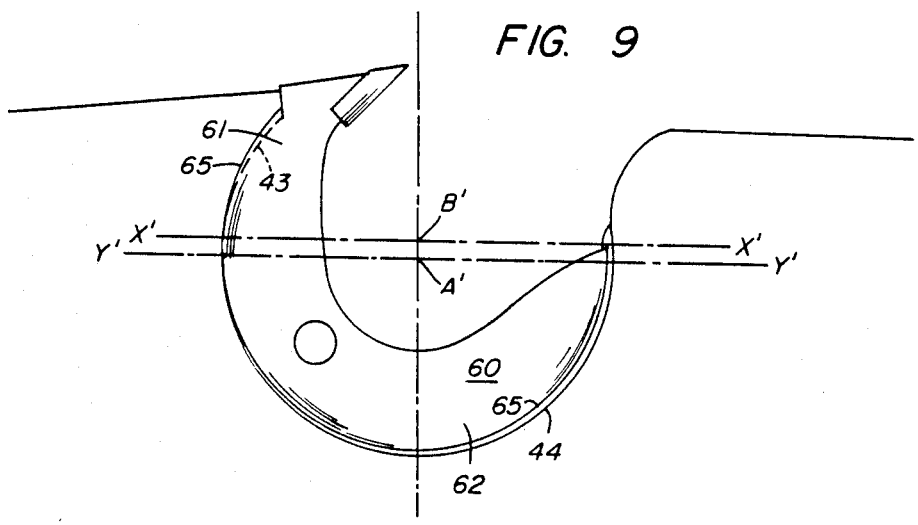
FIG. 9 is the same as FIG. 7, except that it illustrated the dimensional proportions of an insert as shown in FIG. 8 for use with a socket of the one circle type shown in FIG. 4.

Referring specifically to FIG. 9, the saw tooth insert of this invention for use with saw blades having the single circle type sockets, is illustrated in contrast to a single circle socket, in the same manner as FIG. 7 illustrates the double circle arrangement. As with insert 50, of the two circle type, this insert 60 has a shank portion 62 having a circular edge surface 65 with a radius equal to the radius of circular edge surface 44 on socket 40. Accordingly, shank portion 62 is not deformed when inserted into socket 40. The radius of surface 65, being generally the same as that of edge surface 44 is such that the shank portion of the insert will freely revolve within the socket without any deformation or force applied thereto. In a like manner, the bit portion 61, has a circular back edge 65 having a radius approximately the same as circular edge surface 43 in socket 40, and, as in the previously described insert 50, the two radii on the insert 60 are not properly mated for a deflection free fit with the two radii in socket 40, at least before the insert 60 is inserted. The center of radius of the circular edge surface 65 is on a plane raised by a small amount over the plane containing the center of radius of circular edge surface 43. Here again, the plane is raised by an amount of about 2 to 9 percent of the radial length, and ideally 4 to 5 percent, so that the bit portion 61 is slightly pivoted to a more open position as shown. As shown in FIG. 9, point A' is the center of radius of circular edge surface 43, and point B' is the center of radius of circular surface 65 on insert 60. As can be seen, the center of radius B', of circular back surface 65, is on plane x'—x', which is raised by an amount of about 4.5 percent of the radial length from plane y'—y' containing the center of radius A' of circular edge surface 43. As in the previously described embodiment, plane y'—y' is an imaginary plane taken through the center of radius of circular edge surface 43 and is perpendicular to the radius of the saw blade at that point. Plane x'—x' is parallel to plane y'—y'. It should be apparent that the saw tooth insert 60 is not designed to fit within socket 40 without some degree of elastic deformation of the insert, in that the insert 60 cannot be inserted without deforming the insert such that the bit portion 61 is pivotally deformed in the cutting direction. When the insert is properly inserted, the primary expansive force on the socket, is applied primarily at the outer edge of shoulder 32, at one point, with the opposed force primarily against the full circular surface of circular surface 44.

In view of the above discussion, it should be apparent that the principles and benefits arc equally applicable to both the saw blade sockets of the two circle type and the one circle type. In utilizing either type of one piece saw tooth inserts, i.e. two circle or one circle, the bit a::d shank portions thereof are, of course, one piece, so that it is not possible that there can be relative motion therebetween, i.e. between bit and shank, which should be obvious since these are now one piece. Because the insert is one piece, with no possibility of relative motion between the bit and shank, the one piece insert clearly tends to be more firmly engaged within socket, engaging a greater portion of the socket so that there is practically no motion or movement between the insert itself and the saw blade, even after prolonged periods of use. It is believed that this improved result stems from the fact that the primary forces locking in a bit, are the compressive forces acting diametrically across the insert from the bit to diametrically opposed base of the shank. With the two piece insert of the prior art, this compressive force is applied to two different pieces, so that there is a tendency for the two pieces to buckle at their interface if the compressive force is not perfectly centered through the two pieces. With the one piece insert, however, there is no interface where any buckling can occur, so that uneven compressive forces cannot cause movement between the two portions of the insert, and accordingly, there is also no movement between the insert and the saw blade.

In addition to the above, it has been found that the one piece inserts generally impose a more uniform compressive force in the rim of the saw blade. This more uniform compressive force does not tend to very significantly during use, because there is no relative movement between the bit and shank portions which has been responsible for the variations in these compressive forces when using the prior art inserts. As a further benefit, the complete avoidance of any relative movement between the bit and shank, virtually eliminates any lateral forces on the rim of the saw blade and shoulder 32 so that there is virtually no risk of deflecting or fracturing shoulder 32, thereby assuring a straight cut and eliminating a possible hazard.

In addition to the above, it has been found that the one piece inserts of this invention do not tend to appreciable ware or abrade the saw blade sockets with repeated insertion and removal of the inserts. This is believed to be primarily due to the fact that the shank portion of the insert has the same radius as the socket surface into which it is seated, that the ware thereon is greatly reduced. Therefore, it is not believed that oversizing of the one piece inserts will be necessary to any appreciable degree. In fact, the one piece inserts of this invention appear to be firmly seated into the sockets of those older saw blades which have already been warn larger, without any adverse effect. It is apparent therefore, that the radii of the two circular surfaces on the inventive inserts, while ideally being the same as the two mating radii of the socket, need not be precisely the same. Indeed, some minor variations is tolerable without any ill effect.

While the saw tooth insert bits of the prior art have been fabricated by forging techniques, it has been found that the saw tooth inserts of this invention are superior if produced by casting, and particularly the process known as "lost wax" casting. The ability to cast the inserts of this invention as opposed to the prior art practice of forging the insert bits and casting the insert shanks, leads to a significantly reduced production cost.

While the benefits of this invention can be appreciated by a saw tooth insert having any sort of a cutting edge, the design of the one piece inserts is more amenable to the low cost insertion of hardened inserts, such as carbide or other typical cutting insert materials. Because the one piece insert is larger to work with, as compared to the very small bits of the prior art, it is not so difficult to form a notch at the cutting edge in which the cutting insert can be soldered.

I claim:

1. A one piece saw tooth insert for use in combination with a circular saw blade of the circular inserted bit type having a plurality of circumferentially spaced sockets formed in the outer periphery, said sockets having a first generally circular edge surface of a first given radius and a first given center of radius and adapted to receive a saw tooth bit insert, and having a second generally circular edge surface of a second given radius and a second given center of radius and adapted to receive a shank insert such that said shank will hold and lock said bit in place, the length of the first given radius being different from the length of the second given radius; said one piece saw tooth insert comprising a bit portion with a cutting edge thereon and a shank portion, said shank portion having a generally circular outer edge surface with a radius and a center of radius substantially equal to said second given radius and said second given center of radius respectively and adapted to be rotated into and received by said second generally circular edge surface of said socket without substantial deformation of said shank portion, said bit portion having a generally circular outer edge surface with a radius substantially equal to said first given radius but having a center of radius sufficiently off-set from said first given center of radius such that said generally circular outer edge surface of said bit potion is tipped with respect to the first generally circular edge surface of said socket so that the bit portion can be rotated into and received by said first generally circular edge surface of said socket with said bit portion being elastically bent to fit within said first generally circular edge surface of said socket with the cutting edge pivoted against the cutting direction, so that said bit portion is tightly biased against said first generally circular edge surface of said socket, to thereby lock said one piece insert into said socket.

2. A one piece saw tooth insert according to claim 1 in which said first generally circular edge surface of said socket has a center of radius falling on a first plane extending through a center of radius of said second generally circular edge surface of said socket perpendicular to the radius of said saw blade, and said circular edge surface of the bit portion of said one piece inset has a center of radius falling on a second plane parallel to said first plane and raised therefrom by an amount equal to 2 to 9 percent of the radial length of said first generally circular edge surface of said socket.

3. The one piece saw tooth insert of claim 2 wherein said second plane is raised from said first plane by an amount of from 4 to 5 percent of the radial length of said first generally circular edge surface of said socket.

4. The one piece saw tooth insert of claim 1 in which said socket is of the two-circle type wherein said first generally circular edge surface of said socket has a radius larger that the radius of said second generally circular edge surface of said socket, and the generally circular edge on said bit portion of said one piece insert had a radius longer that the radius of the generally circular edge of said shank portion of said one piece insert.

5. The one piece saw tooth insert according to claim 1 in which said one piece insert is formed by casting.

6. The one piece saw tooth insert according to claim 5 in which said one piece insert is formed by lost wax casting.

7. In a circular saw blade of the circular inserted bit type comprising a disk having a plurality of circumferentially spaced bit and shank receiving sockets formed in the outer periphery, said sockets having a first generally circular edge surface of a first given radius and a first given center of radius and adapted to receive a saw tooth bit insert, and having a second generally circular edge surface of a second given radius and second given center of radius and adapted to receive a shank insert such that said shank will hold and lock said bit in place, the length of the first given radius being different from the length of the second given radius; the improvement comprising, a one piece saw tooth insert comprising a bit portion with a cutting edge thereon and a shank portion, said shank portion having a generally circular outer edge surface with a radius and a center of radius substantially equal to said second given radius and said second given center of radius respectively and adapted to be rotated into and received by said second generally circular edge surface of said socket without substantial deformation of said shank portion, said bit portion having a generally circular outer edge surface with a radius substantially equal to said first given radius but having a center of radius sufficiently off-set from said first given center of radius such that said generally circular outer edge surface of said bit portion is tipped with respect to the first generally circular edge surface of said socket so that the bit portion can be rotated into and received by said first generally circular edge surface of said socket with said bit portion being elastically bent to fit within said first generally circular edge surface of said socket with the cutting edge pivoted against the cutting direction, so that said bit portion is tightly biased against said first generally circular edge surface of said socket, to thereby lock said one piece insert into said socket.

8. A circular saw blade according to claim 4 in which said first generally circular edge surface of said socket has a center of radius falling on a first plane extending through a center of radius of said second generally circular edge surface of said socket perpendicular to the radius of said saw blade, and said circular edge surface of the bit portion of said one piece insert has a center of radius falling on a second plane parallel to said first plane and raised therefrom by an amount equal to 2 to 9 percent of the radial length of said first generally circular edge surface of said socket.

9. The one piece saw tooth insert of claim 8 wherein said second plane is raised from said first plane by an amount of from 4 to 5 percent of the radial length of said first generally circular edge surface of said socket.

10. A circular saw blade according to claim 1 in which said socket is of the two-circle type wherein said first generally circular edge surface of said socket has a radius larger that the radius of said second generally circular edge surface of said socket, and the generally circular edge of said bit portion of said one piece insert had a radius longer that the radius of the generally circular edge of said shank portion of said one piece insert.

11. A circular saw blade according to claim 7 in which said one piece insert is formed by casting.

12. A circular saw blade according to claim 11 in which said one piece insert is formed by lost wax casting.

* * * * *